Dec. 11, 1928.
H. E. WALKER
DRAFT FAUCET
Filed Oct. 5, 1925
1,694,694
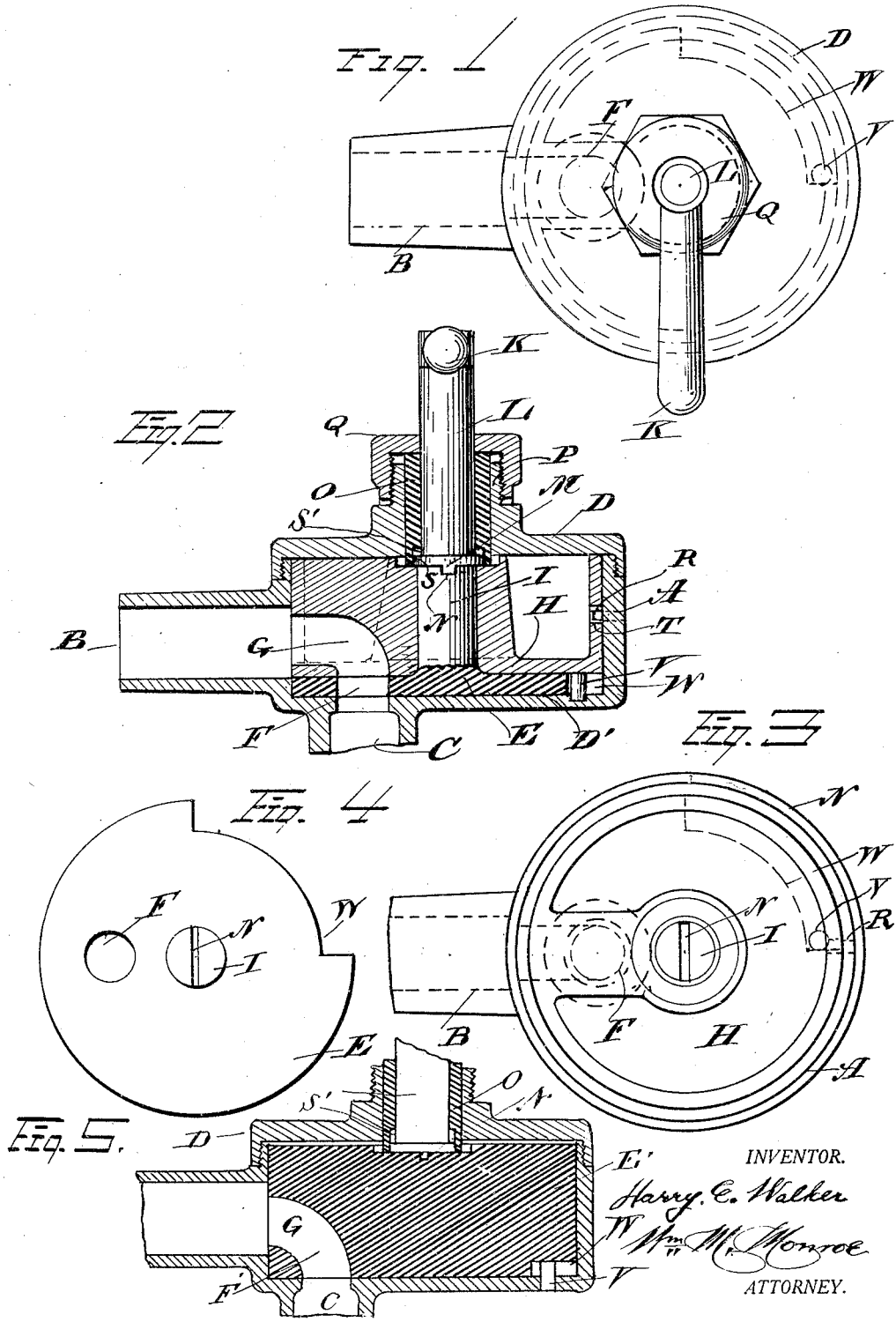
INVENTOR.
Harry E. Walker
Wm M. Monroe
ATTORNEY.

Patented Dec. 11, 1928.

1,694,694

UNITED STATES PATENT OFFICE.

HARRY E. WALKER, OF ELYRIA, OHIO.

DRAFT FAUCET.

Application filed October 5, 1925. Serial No. 60,651.

The objects of the invention are to provide an improvement in the construction of an air or liquid tight dispensing valve that can be used in dispensing either heavy or volatile liquids and is adjustable to compensate for wear upon the moving parts. This valve is particularly adapted for use in draft faucets subjected to wide variations in temperature, and in positions where cylindrical or tapered valves and seats are not efficient to prevent leakage of the liquid therethrough.

The range of usefulness of this valve is very great and I do not confine its use in connection with any one class of liquids or beverages.

The invention comprises a disc shaped valve, a casing therefor having a stationary seat upon which said valve rotates upon one side thereof, and a seat adjustably movable toward and from the other side of said valve to compress the valve upon the stationary seat and operating means therefor.

The valve may be formed of a bronze alloy or other suitable material and the seats are preferably made of brass, thus reducing the amount of frictional contact between the parts.

The invention is hereinafter described, illustrated in the accompanying drawings, and is specifically pointed out in the claims.

In the accompanying drawings, Fig. 1 is a plan of the device. Fig. 2 is a vertical central section thereof. Fig. 3 is a plan thereof with the cover removed. Fig. 4 is a plan of the valve. Fig. 5 shows a solid valve minus the movable seat. In these views, A is a cylindrical casing open at the top and having an inlet passage B at one side thereof, and having an outlet passage C which extends through the lower wall of the casing, and D is a removable screw threaded head, which closes the top or opening in the casing.

The lower wall of the casing forms a stationary lower seat D' upon which a disc shaped valve E revolves, and when the valve is open the port F in this valve registers with an angular port G in the adjustable upper seat H which is enclosed in the casing and is vertically movable between the valve E and the head D upon a valve stem I which is attached axially to the valve E.

This valve is rotated by means of the handle K and shaft L and clutch M thereon engageable with the recess N in the valve stem I.

To make vertical adjustment for the movable seat and valve toward and from the stationary seat D' possible, so as to preserve a liquid tight joint between the valve and its seat D' at all times, a bushing O is sleeved over the shaft L and moves in an annular screw threaded extension P of the removable head D and a screw threaded cap Q is employed to force the bushing toward the movable seat H so as to press the valve E upon its stationary seat D'.

A shoulder S upon the inner end of the shaft L prevents its withdrawal from the casing and valve stem and a recess S' in the bushing receives this shoulder.

The seat H is prevented from revolving upon the stem by means of a pin R in the casing moving in a vertical slot T in the side wall of the seat H.

A stop pin V on the lower side of the movable seat H limits the movements of the valve E and a circumferential recess or arcuate slot W in the edge of the valve receives this pin.

In Fig. 5 a modification is shown in which the vertically movable seat H is omitted and the valve is made thick enough to enclose the entire passage F'. This valve may be depressed in the same manner as hereinbefore described my means of the sleeve O and screw threaded cap Q as shown in Fig. 1.

Having described the invention, what I claim as new and desire to secure by Letters Patent is:

1. In a dispensing valve, a casing closed at one end and having a valve seat in said closed end, a rotatable valve on said seat and an adjustable valve seat mounted upon said valve in said casing, said casing being provided with a lateral inlet opening and with a longitudinal outlet opening, and said valve and adjustable seat provided with outlet openings registering with said casing outlet.

2. In a dispensing valve, a casing closed at one end and having a valve seat in said closed end, a rotatable valve on said seat and an adjustable valve seat mounted upon said valve in said casing, said casing being provided with a lateral inlet opening and with a longitudinal outlet opening, and said valve and adjustable seat provided with outlet openings registering with said casing outlet, and means for compressing said adjustable valve seat upon said valve.

3. In a valve of the character described, a valve casing closed at one end and provided with an outlet passage at that end and open at the other end and provided with a valve seat in the closed end through which said outlet passage passes, said casing being also provided with a lateral inlet passage, a rotatable valve on said valve seat, said valve being provided with a corresponding outlet port, and with a valve stem, an axially movable valve seat in said casing, with which the other side of said valve engages, a closure for the open end of said casing, a bushing engaging with said movable seat, said bushing extending through said closure, a screw threaded cap for said closure engaging with the outer end of said bushing, and operating means for said valve stem, said operating means passing through said bushing and cap, said movable valve seat being provided with a port registering with said inlet and outlet passages in said casing, and with said outlet port in said valve.

4. In a valve of the character described, in combination, a casing having a stationary valve seat, an opposed valve seat movable toward and from said stationary valve seat, a revolvable disc shaped valve intermediate of said seats, and provided with a valve stem extending through said movable valve seat, a removable head for said casing, an adjustable cap thereon, a bushing engaged by said cap and engaging with said movable valve seat, to adjust the same, and an operating shaft for said valve stem passing through said bushing, said casing being provided with inlet and outlet passages and said movable seat having a port registering with both said passages, and said valve having a port registering with the port in said movable seat, and with said outlet port in said casing.

5. In a valve of the character described, in combination, a casing having an open end and a closed end, said closed end having a stationary valve seat, a valve seat movable in said casing toward and from said stationary valve seat, a removable head for said casing, a revolvable disc shaped valve positioned between said seats, and provided with a valve stem extending through said movable valve seat and removable head, an adjustable cap upon said head, a bushing engaged by said cap and engaging said valve seat, an operating shaft for said valve stem passing through said bushing, and a clutch connection between said shaft and valve stem, said casing, valve and seats being provided with registering outlet passages.

In testimony whereof, I hereunto set my hand this 6th day of August, 1925.

HARRY E. WALKER.